J. C. COONLEY.
WHIFFLETREE HOOK AND CLIP.

No. 190,008. Patented April 24, 1877.

Attest,
W. C. Corlies
E. S. Lloyd

Inventor
John C. Coonley.
By Coburn & Thacher
Att'ys

UNITED STATES PATENT OFFICE.

JOHN C. COONLEY, OF CHICAGO, ILLINOIS.

IMPROVEMENT IN WHIFFLETREE HOOKS AND CLIPS.

Specification forming part of Letters Patent No. 190,008, dated April 24, 1877; application filed March 26, 1877.

*To all whom it may concern:*

Be it known that I, JOHN C. COONLEY, of Chicago, in the county of Cook and State of Illinois, have invented a new and useful Improvement in Whiffletree Hooks and Clips, which is fully set forth in the following specification, reference being had to the accompanying drawing, in which—

Figure 1:
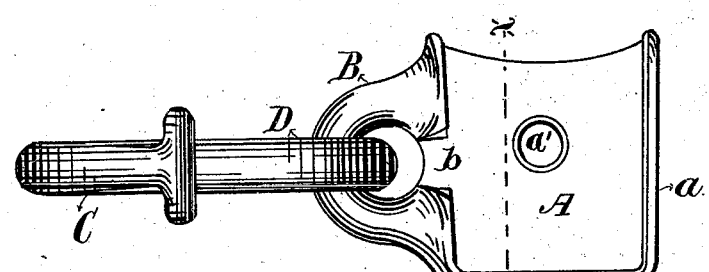
Figure 2:
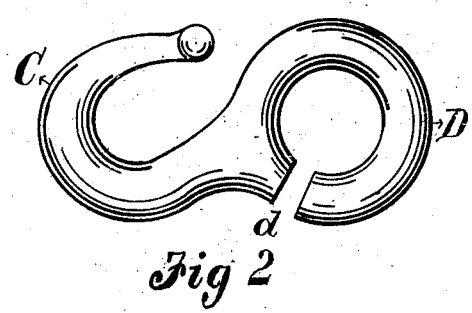

Figure 1 represents a plan view of the clip and hook coupled together; Fig. 2, a side view of the hook detached; and Fig. 3, a sectional view taken on the line $x\,x$, Fig. 1, the hook being turned down in position for uncoupling.

My invention relates to a device for connecting traces to whiffletrees in which a clip and hook are formed, being inserted in the end of the whiffletree, and provided with a ring for the reception of the hook. Heretofore, in coupling devices of this kind, the two parts have been connected together after casting, either by leaving the ring on the clip detached and open at one end, and then inserting the ring of the hook and bending down the free end of the clip-ring, or the ring on the clip has been cast solid and the trace-hook made open at each end, one end being hooked into the clip-ring and afterward closed down or left open, at pleasure. There are objections to both of these constructions. It is desirable that the ring on the clip should be solid for the purpose of securing strength; but if the hook is left open, so as to be readily detached, there is danger of its becoming disconnected when in use, and if it is closed up after insertion in the ring, the two parts cannot be uncoupled without difficulty.

The object of my invention is to secure a hook and clip which may be readily coupled and uncoupled when detached from the whiffletree, but which will be secure from all accidental uncoupling after the clip is fastened in the end of the whiffletree.

The invention consists in constructing the clip with a solid ring, flanges around the outer edges, in the usual manner, and with a solid ring on one edge, opposite which the flanges are recessed or cut away, and in combining therewith a hook having an opening in its ring wide enough to receive the thin portion or web of the clip, but narrower than the ring, so that the two may be coupled or uncoupled, as will be hereinafter more fully described.

In the drawings, A represents a clip, which is constructed with vertical flanges $a$ around its outer edge on three sides, in the usual manner. The body or web of this clip is flat and thin, so that it may be readily inserted in the end of a whiffletree, the flanges $a$ fitting upon the outside thereof, and a suitable pin or screw being put through the whiffletree and a hole, $a'$, in the clip, to complete the fastening. On one side of the clip A is a ring, B, which is cast solid and in one piece with the clip. The flanges $a$ on opposite sides of the web are cut away to form openings $b$ adjacent to the ring B, the recesses or openings being cut down even with the body of the clip. The trace-hook C is made with a ring, D, at one end, which is divided or provided with an opening, $d$. This opening $d$ corresponds in width to the thickness of the web or body of the clip A, so that it will receive the latter.

Figure 3:
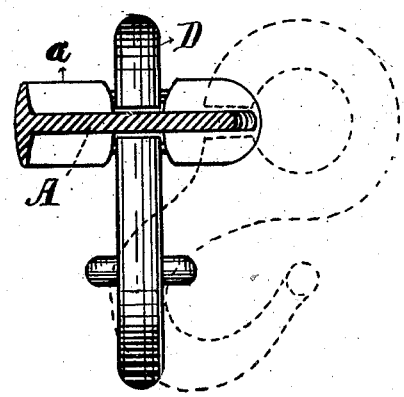

The two parts being cast in the form shown and described above, they are coupled together by turning the hook down into the position shown in dotted lines in Fig. 3 of the drawings, and then slipping the web of the clip through the opening $d$ until the latter is brought opposite the openings $b$ in the flanges $a$, when it is evident that the ring D may be pushed forward through the recesses in the flanges into the ring B of the clip. The ring B is considerably larger than the opening in the ring, so that after the two parts are coupled, as described above, they cannot be disconnected, except by reversing the steps taken in coupling them together. When the clip is driven into the end of the whiffletree it is evident that the accidental uncoupling of the hook and clip is utterly impossible, as the openings through the flanges into the ring B are closed by the whiffletree. If, however, either of the parts should be broken or become worn, the clip may be removed from the whiffletree, the two parts uncoupled, and a new part substituted for the worn or broken one.

By this improvement I am enabled to secure all the advantages of the closed ring on the clip, while at the same time the hook and clip may be coupled and uncoupled without bending or in any way changing the form of either after casting, and when the clip is inserted in the whiffletree an entirely safe attachment is formed, it being utterly impossible to disconnect the two parts while in this position.

Although the hook is constructed with a divided ring, its strength is not materially impaired, for the size of the ring portion is, usually, about the same as that of the hook, and as the latter is open, it will sustain no greater strain than the open ring.

The clip may be made without the flanges around the edge, if desired; but I prefer the flanged construction shown and described, as it is stronger and may be more securely fastened to the whiffletree.

Having thus described my invention, what I claim as new, and desire to secure by Letters Patent, is—

1. A whiffletree-clip, A, constructed with a solid ring, B, in combination with a hook the ring of which is divided by an opening about as wide as the thickness of the clip, the two parts being adapted to couple and uncouple readily when detached from the whiffletree, but permanently connected together by inserting the clip in the whiffletree, substantially as described.

2. The flanged whiffletree-clip A, constructed with a solid ring, B, and provided with recesses or openings $b$ in the flanges $a$, adjacent to the ring, substantially as and for the purpose set forth.

3. The flanged clip A, constructed with a solid ring, B, and recesses $b$ in the flanges $a$ adjacent thereto, in combination with the hook C, having an opening, $d$, in the ring end thereof, substantially as and for the purpose set forth.

JNO. C. COONLEY.

Witnesses:
L. A. BUNTING,
WILLIAM D. EWART.